United States Patent [19]

Davis et al.

[11] Patent Number: 4,769,968

[45] Date of Patent: Sep. 13, 1988

[54] TRUSS-CORE CORRUGATION FOR COMPRESSIVE LOADS

[75] Inventors: Randall C. Davis, Poquoson; L. Robert Jackson, Newport News, both of Va.

[73] Assignee: The United States of America as represented by the Administrator of the National Aeronautics and Space Administration, Washington, D.C.

[21] Appl. No.: 22,298

[22] Filed: Mar. 5, 1987

[51] Int. Cl.[4] .......................... E04C 2/32; B32B 3/28
[52] U.S. Cl. ..................................... 52/814; 52/821; 428/182
[58] Field of Search .................... 52/730–732, 52/795–802, 821, 828, 814; 428/157, 182

[56] References Cited

U.S. PATENT DOCUMENTS

| | | |
|---|---|---|
| 523,075 | 7/1894 | Krause ........................ 52/732 |
| 1,311,205 | 7/1919 | Belcher . |
| 1,407,242 | 2/1922 | Wylie ........................ 52/731 |
| 1,469,220 | 1/1919 | Kemp . |
| 1,560,996 | 3/1925 | Kellogg ..................... 244/131 |
| 1,604,151 | 10/1926 | Dornier ..................... 52/732 |
| 1,751,957 | 7/1929 | Towle . |
| 1,883,672 | 1/1931 | Foster . |
| 1,900,743 | 3/1933 | Strobl . |
| 1,930,285 | 10/1933 | Robinson ................... 244/131 |
| 2,095,626 | 10/1937 | Bassett et al. . |
| 2,241,972 | 2/1938 | Wagner . |
| 2,389,767 | 9/1943 | Dalton . |
| 2,742,247 | 10/1951 | Lachmann . |
| 3,119,333 | 1/1964 | Loughran . |
| 3,156,070 | 11/1964 | Mesnager .................... 52/630 |
| 3,924,793 | 12/1975 | Summers et al. ............ 228/157 |
| 3,970,270 | 7/1976 | Pittet, Jr. ................... 244/125 |
| 3,975,882 | 8/1976 | Walter ........................ 52/571 |
| 3,995,080 | 11/1976 | Cogburn et al. ............. 52/731 |
| 4,292,375 | 9/1981 | Ko ............................. 428/157 |
| 4,472,473 | 9/1984 | Davis et al. ................. 428/182 |

FOREIGN PATENT DOCUMENTS

| | | |
|---|---|---|
| 14928 | of 1915 | United Kingdom ........... 52/797 |
| 175111 | 2/1922 | United Kingdom ........... 52/731 |

OTHER PUBLICATIONS

NASA Technical Publication No. 2272.

Primary Examiner—James L. Ridgill, Jr.
Attorney, Agent, or Firm—George F. Helfrich; John R. Manning; Charles E. B. Glenn

[57] ABSTRACT

A corrugated panel structure for supporting compressive loads includes curved cap strips 22 separated by truss-core web segments 30. The truss-core web segments 30 are formed from first and second flat panels 32 and 34 with a corrugated filler 36 therebetween. The corrugated filler 36 extends in the direction of the compressive load, thereby providing load carrying capability for the compressive load. As a result, all components of the panel structure have a compressive load carrying capability resulting in a high strength-to-weight ratio when the compressive load is limiting.

11 Claims, 4 Drawing Sheets

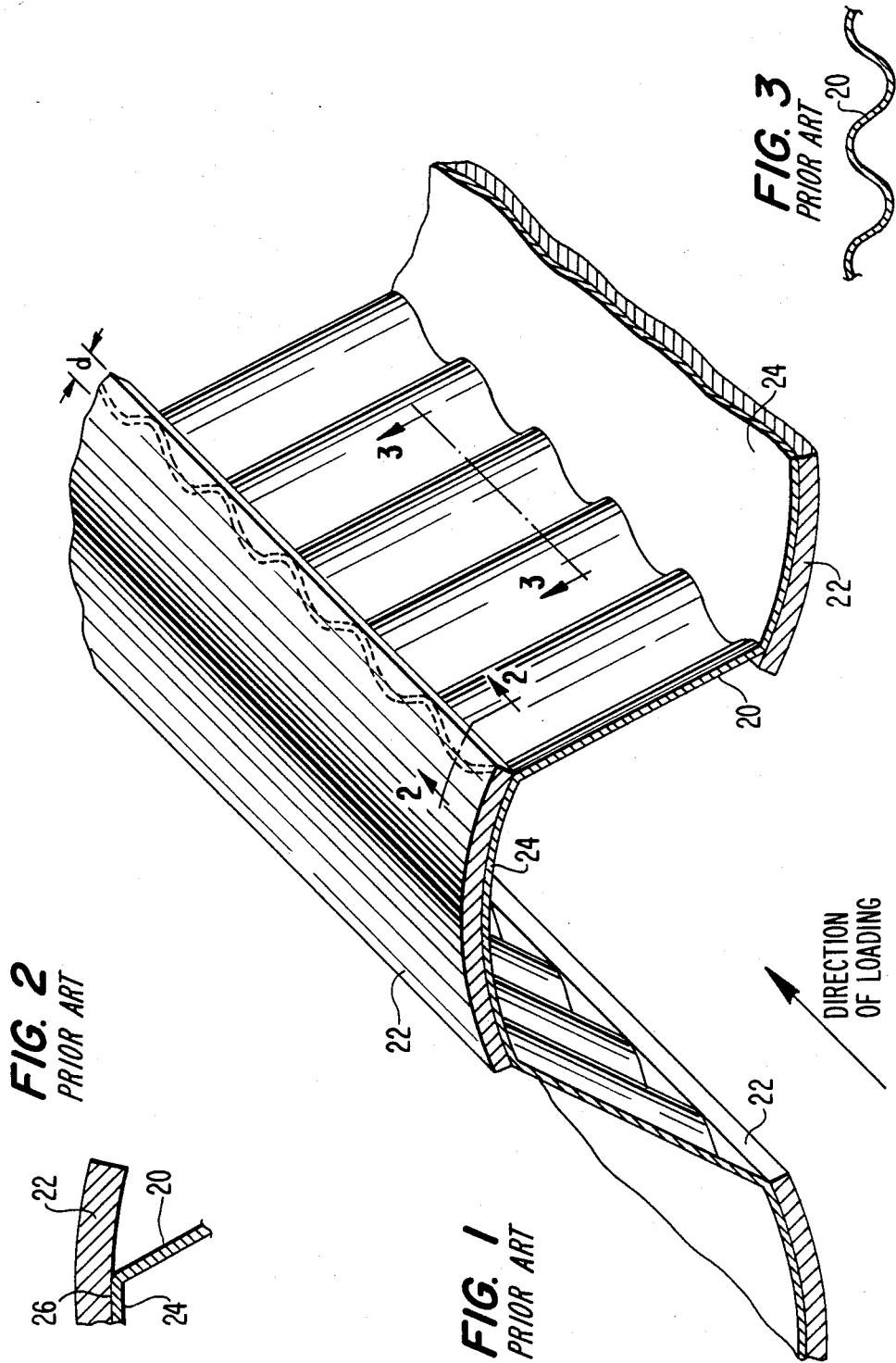

TRUSS-CORE CORRUGATION FOR COMPRESSIVE LOADS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a structure for supporting compressive loads with a high strength-to-weight efficiency and, more particularly, to a structure which can be used in the fuselage of a rocket or aircraft or to form fuel tanks.

2. Description of the Related Art

In applications where it is desirable for a structure to be as light as possible while withstanding relatively high loads, e.g., in an aircraft or rocket, many types of structures have been used. In the prior art, the highest efficiency structure for carrying a compressive load utilizes a corrugated panel construction. This structure is illustrated in FIGS. 1-3 and includes beaded-web corrugation 20 bonded to cap strips 22 at uncorrugated regions or "flats" 24 at bond lines 26 (FIG. 2). As illustrated in cross-section in FIG. 3, the corrugated portion of the beaded web 20 has an undulating or sinusoidal cross-section.

The beaded web 20 is typically superplastic formed of very thin sheets with concurrent diffusion bonding (SPF/DB) to the curved cap strips 22. As described in U.S. Pat. No. 4,292,375, the SPF/DB method of fabrication utilizes two inherent phenomena which tend to occur concurrently in, e.g., titanium alloys. The first phenomenon is the ability of a material, such as titanium alloy, to undergo large, up to 1,000 percent strain, plastic deformations at high temperatures without localized thinning, or necking. This phenomenon often is referred to as superplasticity. The second phenomenon relates to the capability of being joined under pressures at elevated temperatures, without melting or the use of bonding agents, which is referred to as diffusion bonding.

In an optimized design the corrugation structure illustrated in FIG. 1 may have an overall thickness of two to three (2-3) inches from the top of a curved cap 22 on one side to the top of another cap 22 curved in the opposite direction. The beaded-web 20 and cap strip 22 may have thicknesses of two to five (2-5) mil and thirty to sixty (30-60) mil, respectively. Since FIGS. 1-3 are approximately to scale for the above "optimized design", a good approximation for other dimensions can be obtained from FIGS. 1-3.

In this "optimized designs", the beaded-web material 20 accounts for two-thirds of the total structural mass. The web material 20 is beaded so that it provides a load carrying capacity in a direction perpendicular to the compressive load and the "flats" to which the cap strips 22 are bonded are so thin they provide an insignificant amount of load carrying capability. Consequently, 67% of a beaded-web, curved-cap corrugation structure, constructed as described above, carries very little of the compressive load. When the compressive loading is limiting, there is considerable inefficiency and limiting, there is considerable inefficiency and potential room for improvement.

In the beaded-web, curved-cap structure, the cap strips 22 carry the compressive load. The thickness-to-width ratio and the edge restraint of the cap strips 22 determine the ability of the cap strips 22 to resist local buckling. The beading in the web 20 helps prevent local buckling in the web 20 while allowing maximum separation between the strips 22. The separation between the cap strips determines the stiffness of the corrugation structure to resist overall buckling. The bead depth d (FIG. 1) helps provide edge restraint for the cap strips 22, but introduces load discontinuities due to the variation in the amount of the cap strip 22 which is supported by the beaded web 20.

SUMMARY OF THE INVENTION

An object of the present invention is to provide a structure for a compressive loading limited application having a high strength-to-weight structural efficiency.

A further object of the present invention is to provide a cap-web corrugated panel in which the web portion of the panel is load carrying.

Another object of the present invention is to provide a cap-web corrugated panel having caps with high local buckling strength.

A further object of the present invention is to provide a cap-web corrugated panel with no load discontinuities.

An additional object of the present invention is to provide a cap-web corrugated panel in which the web segments provide a continuous straight support for the edges of the caps.

The above-mentioned objects are obtained by providing a corrugated panel structure for supporting a compressive load in a length direction, comprising cap strips, extending in the length direction and having a curved cross-section, and truss-core web segments, bonded to and separating the cap strips, each truss-core web segment having a sandwich construction and including first and second flat panels parallel to the length direction and a corrugated filler, bonded between the first and second flat panels, extending in the length direction with a non-linear cross-section.

In a preferred embodiment, the first and second flat panels of the truss-core web segment are offset in a width direction perpendicular to the length direction, thereby forming a first extension of the first flat panel which extends beyond the second flat panel at one side of the truss-core web segment and a second extension of the second flat panel which extends beyond the first flat panel on an opposite side of the truss-core web segment. In this embodiment, the first and second panels each include a flange, formed on one of the first and second extensions, for bonding to the cap strips. If maximum strength is desired and the corrugated panel is protected by, e.g., a heat shield, the cap strips are preferably convex, i.e., formed with a first side bonded to the truss-core web segments and with the curved cross-section of each of the cap strips forming an apex on a second side opposite the first side. A slight amount of structural strength can be traded for increased damage resistance by forming concave cap strips, i.e., so that each of the cap strips has an apex between two of the truss-core segments. With concave cap strips, increased rotational stability of the cap strips can be provided by crimping the cap strips to form third and fourth extensions on each of the cap strips, each of the third and fourth extensions bonding to the outside of one of the first and second panels of one of the truss-core web segments, where the inside of the first and second panels is bonded to the corrugated filler.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 1 is a perspective view of a prior art beaded-web corrugated panel;

FIG. 2 is a cross-section view, taken along line 2—2 of FIG. 1, illustrating the bonding of the edge of a cap strip beaded-web corrugation in the prior art;

FIG. 3 is a cross-section view, taken along line 3—3 in Fi 1 illustrating the beaded-web in the prior art;

DESCRIPTION OF THE PREFERRED EMBODIMENTS

Figure 4:
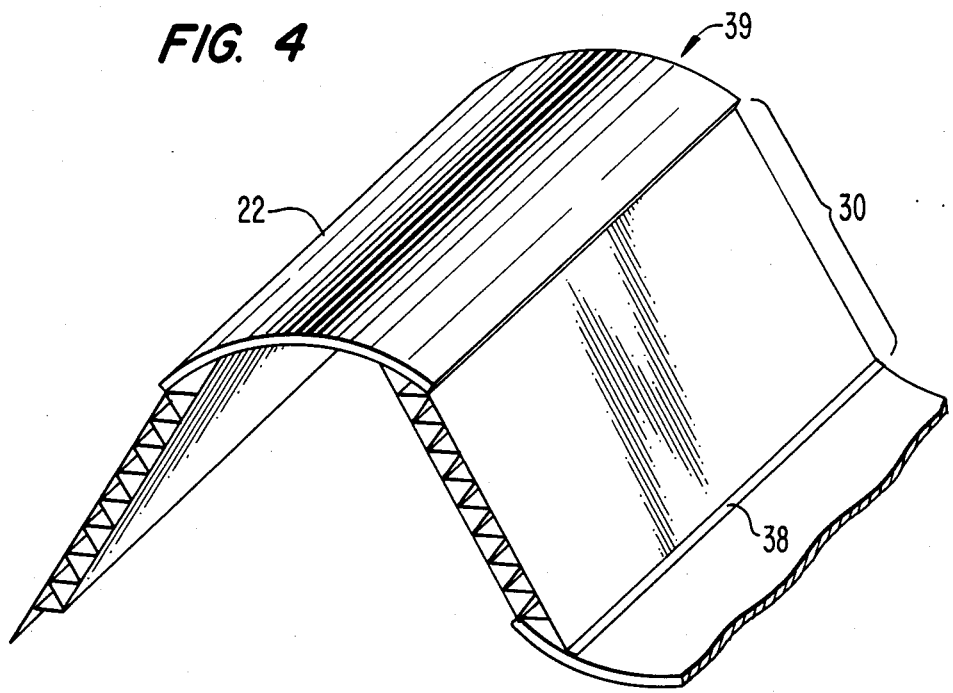
FIG. 4 is a perspective view of a corrugated panel according present invention.
Figure 5:
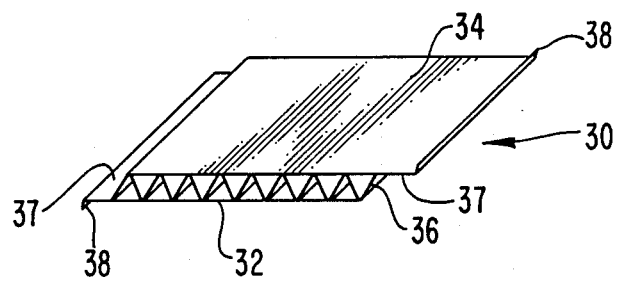
FIG. 5 is a perspective view of a single truss-core web segment used in a corrugated panel according to the present invention.

Referring to FIGS. 4 and 5, according to the present invention, the curved cap 22 is supported by a truss-core web segment 30 instead of the beaded web 20. As illustrated in FIG. 5, the truss-core web segment 30 is formed from an inner flat panel 32 which is separated from an outer flat panel 34 by a corrugated filler 36. As illustrated in FIG. 4, the corrugations in the filler 36 extend in the direction of loading and thus are capable of carrying part of the compressive load. The corrugated filler 36 may have a substantially saw-tooth cross-section, as illustrated in FIG. 5 or a more sinusoidal cross-section.

The flat panels 32 and 34 in each truss-core web segment 30 are preferably offset in the width direction (perpendicular to the length direction of the compressive load), so that each panel has an extension 37 extending beyond the adjacent panel. Each of the extensions 37 joins a cap strip 22 at a flange 38 on a side of the cap strip 22 which is opposite the apex 39. Thus, the truss-core web segment 30 provides rotational restraint for the cap 22 without any load discontinuities as in the prior art beaded-web, curved-cap structure illustrated in FIG. 1. The truss-core web 30 provides significantly more stiffness to support the edges of the cap strips 22, thus greatly improving the local buckling strength of the caps 22.

Figure 6:
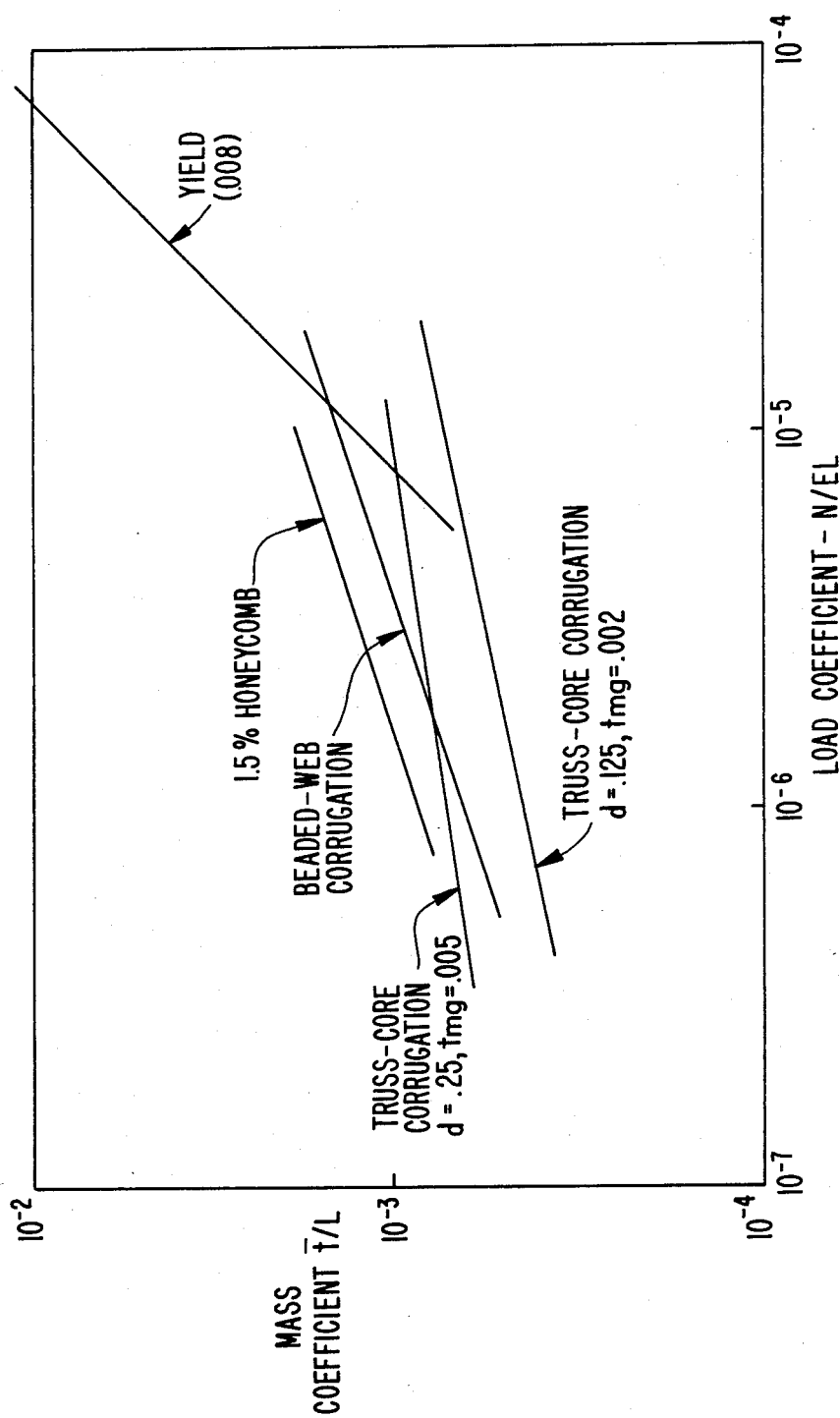
FIG. 6 is a plot of structural efficiency curves for two prior art structures and two truss-core corrugations according to the present invention.

The significant advantages of the present invention over prior art structures are indicated in FIG. 6 which compares the strength-to-weight efficiency of various panel constructions under compressive loading on a log-log graph. The ordinate is a mass coefficient $\bar{t}/L$, where $\bar{t}$ is a mass equivalent thickness and L is the length of the span, e.g., 30 inches. The abscissa is a strength coefficient N/EL which is determined for a panel with material modulus E transferring a compressive load per unit width N over a span of length L. The most efficient panel for a given load will have the lowest value of $\bar{t}/L$. The line "yield (0.008)" indicates the upper limit of a structure's load carrying ability without yielding or buckling.

As depicted in FIG. 6, truss-core corrugation structures have significantly lower mass coefficients for certain dimensions and load coefficients, compared to both beaded-web corrugation and a 1.5% honeycomb structure which is presently in use in some applications. A truss-core corrugation structure with a truss-core depth (d) of 0.25 inches and a truss-core with flat panels and inner corrugation formed from foil with a thickness (tmg) of 0.005 inches (5 mil) has a lower mass coefficient than the beaded-web corrugation at higher loads, while the truss-core corrugation with d=0.125 inches and tmg=0.002 inches is substantially lower than the beaded-web corrugation over a wide range of loads.

Figure 7:
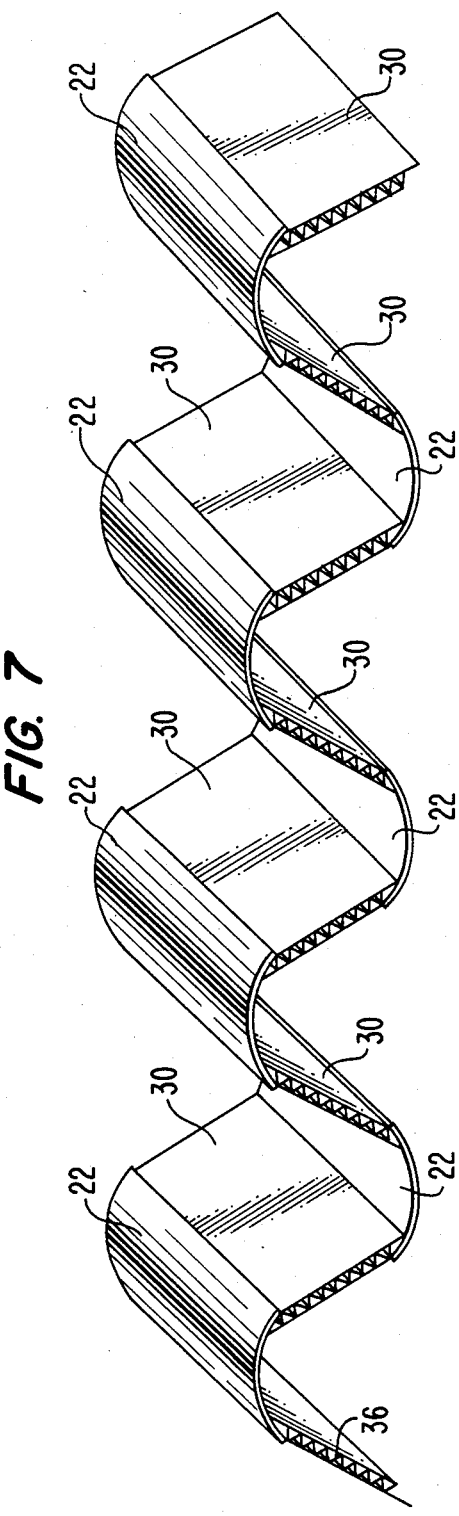
FIG. 7 is a perspective view of a straight section of a corrugated panel according to a first embodiment of the present invention.

The truss-core corrugation structure illustrated in FIG. 4 can be repeated to form a structure of any desired width, or with gradual curvature to form a continuous cylindrical housing or shell such as that used in a fuselage or fuel tank. A straight structure containing several cap strips 22 and truss-core segments 30 is illustrated in FIG. 7.

Figure 8:
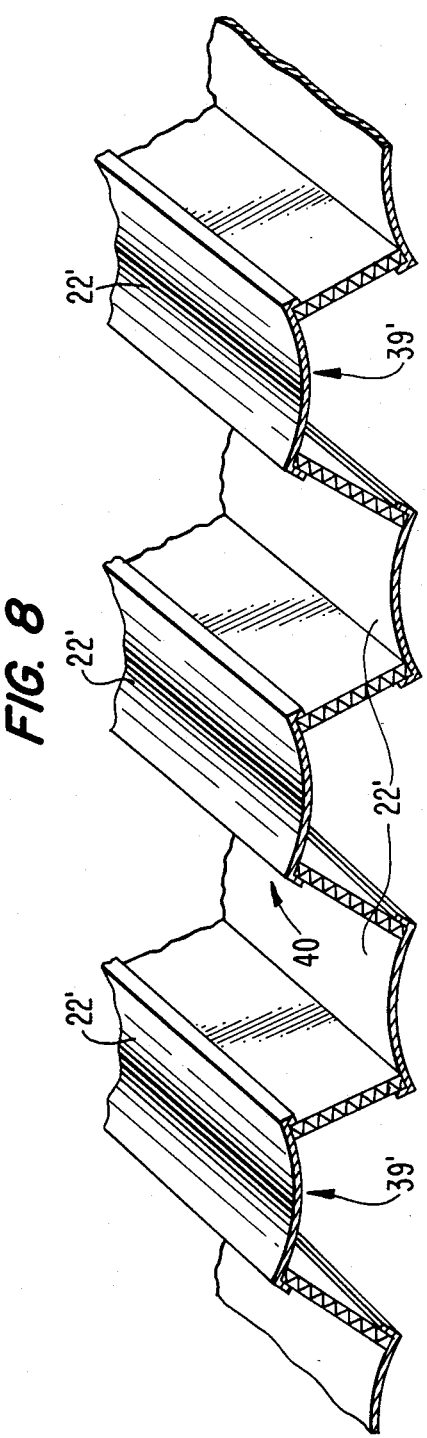
FIG. 8 is a perspective view of a straight section of a corrugated panel according to a second embodiment of the present invention.

In addition, the cap strip 22 can be modified to provide additional stability. FIG. 8 illustrates a group of several modified cap strips 22' having a concave surface with an apex 39' between two truss-core segments 30, instead of the convex surface illustrated in FIGS. 4, 5 and 7. The modified cap strips 22' include crimped edges forming extensions 40 which further stabilize the cap edges against rotation. The concave curvature of the cap strips 22' improves the damage resistance of the structure, although slightly reducing the load capacity. Thus, the structure illustrated in FIG. 8 would be used primarily where insufficient protection is provided by an outer skin surrounding the corrugation.

The foregoing is considered as illustrative only of the principles of the invention. Further, since numerous modifications and changes will readily occur to these skilled in the art, it is not desired to limit the invention to the exact construction and applications shown and described, and accordingly, all suitable modifications and equivalents may be resorted to, falling within the scope of the invention and the appended claims and their equivalents. For example, either or both of the truss-core web sections 30 and the metal cap strips 22 may be metallic, metallic with composite reinforcement or non-metallic materials, such as fibrous composite materials.

What is claimed is:

1. A corrugated panel structure for supporting a compressive load in a length direction, comprising: cap strips extending in the length direction, having a curved cross-section; and truss-core web segments, bonded to and separating said cap strips in an open cross-section arrangement each truss-core web segment having a sandwich construction, including first and second flat panels parallel to the length direction and a corrugated filler, bonded between said first and second flat panels, extending in the length direction with a non-linear cross-section.

2. A corrugated panel structure as recited in claim 1, wherein said corrugated filler has a substantially saw-toothed cross-section.

3. A corrugated panel structure as recited in claim 1, wherein said corrugated filler has a substantially sinusoidal cross-section.

4. A corrugated panel structure as recited in claim 1, wherein said cap strips have a first side bonded to said truss-core web segments and the curved cross-section of each of said cap strips forms an apex on a second side opposite the first side.

5. A corrugated panel structure as recited in claim 1, wherein the cross-section of each of said cap strips has an apex formed between two of said truss-core segments.

6. A corrugated panel structure as recited in claim 1, wherein said first and second flat panels are offset in a width direction perpendicular to the length direction, said first flat panel thereby including a first extension extending beyond said second flat panel at one side of each of said truss-core web segments and said second flat panel including a second extension extending beyond said first flat panel at an opposite side of each of said truss-core web segments.

7. A corrugated panel structure as recited in claim 6, wherein said first and second flat panels each have an inside and an outside, the inside being bonded to said corrugated filler, and wherein each of said cap strips include third and fourth extensions, each bonding to the outside of one of said first and second panels of one of said truss-core web segments.

8. A corrugated panel structure as recited in claim 6, wherein said first and second panels each include a flange, formed on one of said first and second extensions of said first and second panels, for bonding to said cap strips.

9. A corrugated panel structure as recited in claim 8, wherein said cap strips have a first side bonded to said truss-core web segments and the curved cross-section of each of said cap strips forms an apex on a second side opposite the first side.

10. A corrugated panel structure as recited in claim 8, wherein the cross-section of each of said cap strips has an apex formed between two of said truss-core segments.

11. A corrugated panel structure for supporting a compressive load in a length direction, comprising:

cap strips extending in the length direction, having a curved cross-section with an apex; and truss-core web segments, bonded to and separating said cap strips, the apex of the curved cross-section of each of said cap strips being formed between two of said truss-core web segments, each of said truss-core web segments having a sandwich construction, including first and second flat panels parallel to the length direction and a corrugated filler, bonded between said first and second flat panels, extending in the length direction with a non-linear cross-section.

* * * * *